US010757326B2

(12) United States Patent
Matsumoto

(10) Patent No.: US 10,757,326 B2
(45) Date of Patent: Aug. 25, 2020

(54) IMAGE PROCESSING APPARATUS AND IMAGE PROCESSING APPARATUS CONTROL METHOD

(71) Applicant: CANON KABUSHIKI KAISHA, Tokyo (JP)

(72) Inventor: Shogo Matsumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 15/962,594

(22) Filed: Apr. 25, 2018

(65) Prior Publication Data

US 2018/0316858 A1 Nov. 1, 2018

(30) Foreign Application Priority Data

Apr. 28, 2017 (JP) ................ 2017-090578

(51) Int. Cl.
| | | |
|---|---|---|
| H04N 5/232 | (2006.01) | |
| H04N 5/235 | (2006.01) | |
| H04N 5/225 | (2006.01) | |
| G03B 37/02 | (2006.01) | |
| H04N 101/00 | (2006.01) | |
| H04N 5/341 | (2011.01) | |

(52) U.S. Cl.
CPC ........ *H04N 5/23238* (2013.01); *G03B 37/02* (2013.01); *H04N 5/2256* (2013.01); *H04N 5/2353* (2013.01); *H04N 5/2354* (2013.01); *H04N 5/23212* (2013.01); *H04N 5/23229* (2013.01); *H04N 5/23232* (2013.01); *H04N 5/232935* (2018.08); *H04N 5/3415* (2013.01); *H04N 2101/00* (2013.01)

(58) Field of Classification Search
None
See application file for complete search history.

(56) References Cited

U.S. PATENT DOCUMENTS

| | | | | |
|---|---|---|---|---|
| 2007/0025723 | A1* | 2/2007 | Baudisch | G03B 13/02 396/287 |
| 2008/0159652 | A1* | 7/2008 | Shimizu | G06T 3/4038 382/284 |
| 2011/0242274 | A1* | 10/2011 | Yamaji | G06T 3/4038 348/36 |
| 2012/0263397 | A1* | 10/2012 | Kimura | H04N 5/23238 382/284 |
| 2013/0314493 | A1* | 11/2013 | Sakanaba | H04N 5/23238 348/36 |

(Continued)

FOREIGN PATENT DOCUMENTS

JP  2000-244814 A  9/2000

*Primary Examiner* — Quan Pham
(74) *Attorney, Agent, or Firm* — Canon U.S.A., Inc. IP Division

(57) ABSTRACT

An image processing apparatus includes a combining unit configured to combine a plurality of images to generate a panoramic image, a determination unit configured to determine whether the combination of the plurality of images is successful, and a recording unit configured to record the panoramic image. The recording unit records the panoramic image when the determination unit determines that the combination for generating the panoramic image is successful and records one of the plurality of images or an image obtained by cutting out a part of the image when the determination unit determines that the combination for generating the panoramic image is unsuccessful.

9 Claims, 11 Drawing Sheets

(56) References Cited

U.S. PATENT DOCUMENTS

| | | | | |
|---|---|---|---|---|
| 2014/0132708 A1* | 5/2014 | Kato | ................... | H04N 5/23238 348/36 |
| 2014/0152765 A1* | 6/2014 | Okuda | ............... | H04N 5/23238 348/36 |
| 2015/0097976 A1* | 4/2015 | Nakanishi | .............. | H04N 5/145 348/208.1 |
| 2016/0071238 A1* | 3/2016 | Kimura | ............. | H04N 5/23238 348/36 |

\* cited by examiner

FIG. 8
FIG. 8A
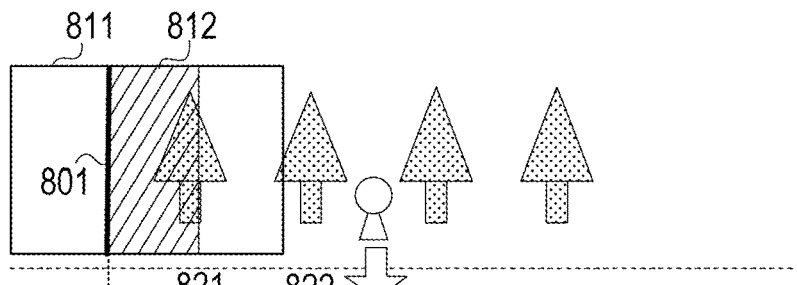
FIG. 8B
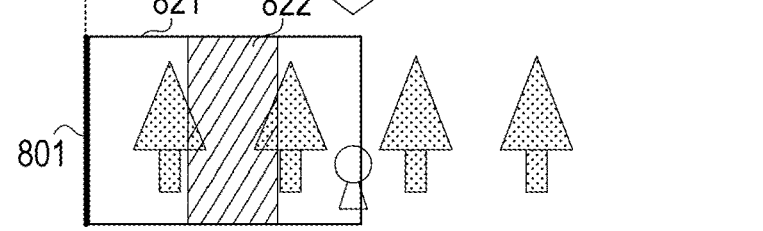
FIG. 8C
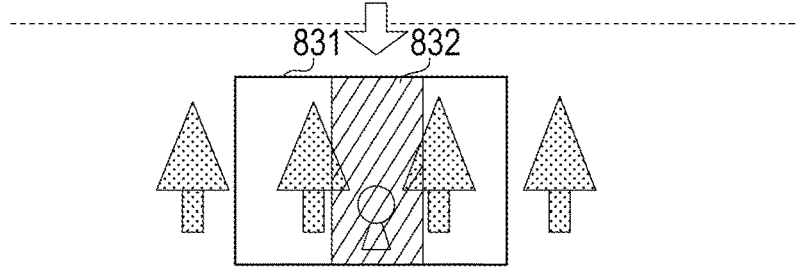
FIG. 8D
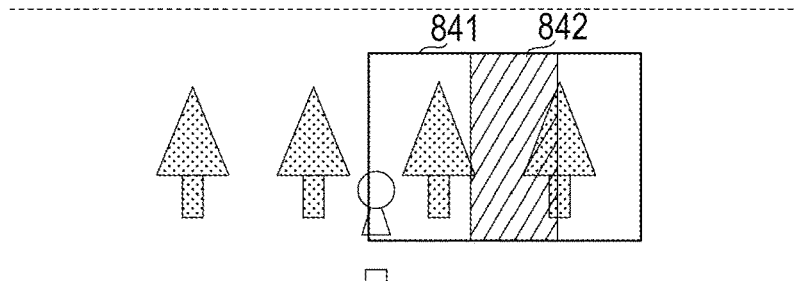
FIG. 8E
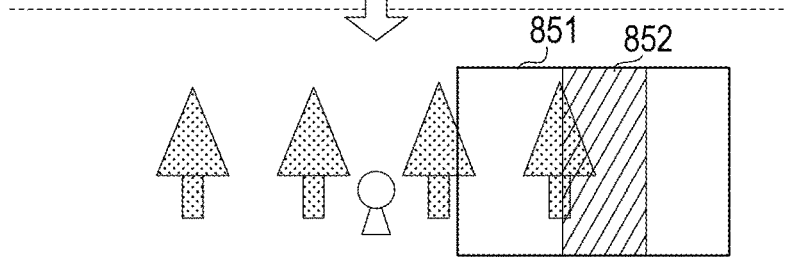
FIG. 8F
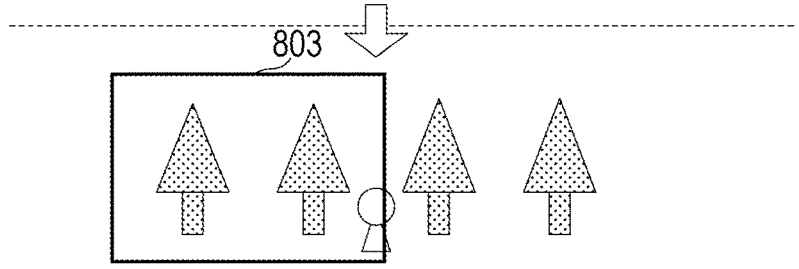

IMAGE PROCESSING APPARATUS AND IMAGE PROCESSING APPARATUS CONTROL METHOD

BACKGROUND OF THE INVENTION

Field of the Invention

The present invention relates to an image processing apparatus, and particularly, to an image processing apparatus that generates a panoramic image.

Description of the Related Art

There is known a technique that captures a plurality of images while moving a digital camera or the like and combines the captured images to generate a panoramic image (e.g., Japanese Patent Laid-Open No. 2000-244814).

When the movement of the digital camera is too fast, or the digital camera moves in the opposite direction halfway, the images cannot be combined. Thus, the generation of a panoramic image may be unsuccessful. The unsuccessful panoramic image has an unnatural joint of subjects and has a distorted subject. Thus, it is undesired to record the unsuccessful panoramic image.

Thus, it can be considered to delete all captured images when the generation of a panoramic image is unsuccessful. However, in this case, no image is recorded. Thus, in order to leave the subject as an image, it is necessary to redo image capturing.

On the other hand, it can also be considered that all images captured for generating a panoramic image may be stored without being combined. In this case, although images can be left, many similar images are recorded. Thus, a recording capacity is consumed, and it takes some effort to organize captured images.

SUMMARY OF THE INVENTION

The present invention has been made in view of the above problems, and an object thereof is to provide an image processing apparatus capable of recording an appropriate image when a panoramic image cannot be generated.

An image processing apparatus according to embodiments of the present invention includes a combining unit configured to combine a plurality of images to generate a panoramic image, a determination unit configured to determine whether the combination of the plurality of images is successful, and a recording unit configured to record the panoramic image. The recording unit records the panoramic image when the determination unit determines that the combination for generating the panoramic image is successful and records one of the plurality of images or an image obtained by cutting out a part of the image when the determination unit determines that the combination for generating the panoramic image is unsuccessful.

Further features of the present invention will become apparent from the following description of exemplary embodiments (with reference to the attached drawings).

BRIEF DESCRIPTION OF THE DRAWINGS

FIGS. 8A to 8F are diagrams for describing another example of the selection of a recorded image in the first embodiment.

DESCRIPTION OF THE EMBODIMENTS

Hereinbelow, embodiments of the present invention will be described in detail with reference to the accompanying drawings.

First Embodiment

Figure 1:
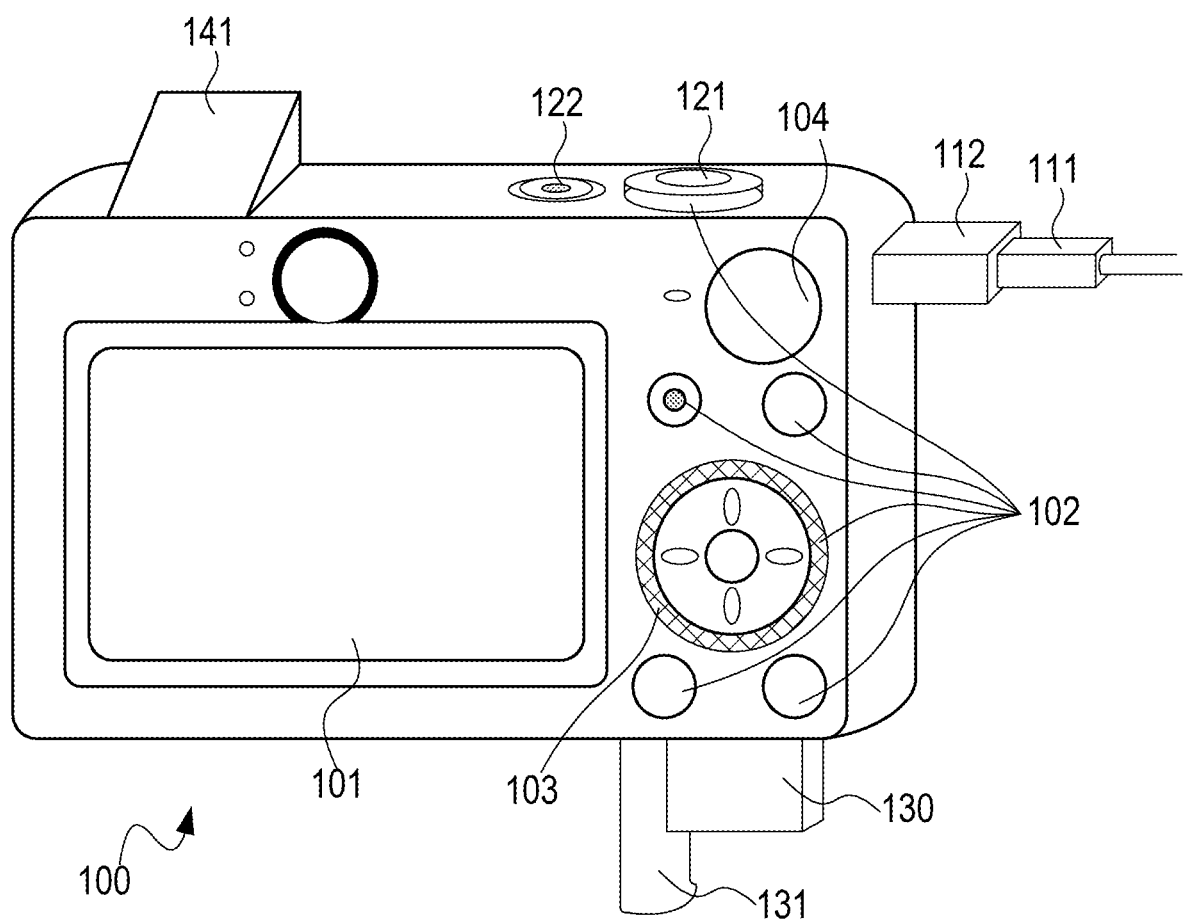
FIG. 1 is a perspective rear view illustrating a schematic configuration of a digital camera according to an embodiment of the present invention.

FIG. 1 is a rear perspective view illustrating a schematic configuration of a digital camera according to an embodiment of the present invention.

The digital camera 100 includes, on the rear face thereof, a display unit 101 which displays an image and various pieces of information and an operation unit 102 which includes operation members, such as various switches and buttons, which receive various operations by a user. Further, the digital camera 100 includes, on the rear face thereof, a mode selection switch 104 which selects an image capturing mode and a controller wheel 103 which is rotatably operable. The digital camera 100 includes, on the upper face thereof, a shutter button 121 which performs an image capturing instruction, a power switch 122 which switches on and off of power of the digital camera 100, and a flash 141 which applies a flash of light to a subject.

The digital camera 100 is connectable to an external device through a connection cable 111 and a connector 112 and capable of outputting image data (still image data or moving image data) to the external device. The digital camera 100 includes, on the lower face thereof, a recording medium slot (not illustrated) which is openable and closable by a lid 131 so that a recording medium 130 such as a memory card is removably insertable into the recording medium slot.

The recording medium 130 stored in the recording medium slot is capable of communicating with a system control unit 210 (refer to FIG. 2) of the digital camera 100. The recording medium 130 is not limited to a memory card which is removably insertable into the recording medium slot. The recording medium 130 may be an optical disk such as a DVD-RW disk or a magnetic disk such as a hard disk.

Further, the recording medium 130 may be built in a main body of the digital camera 100.

Figure 2:
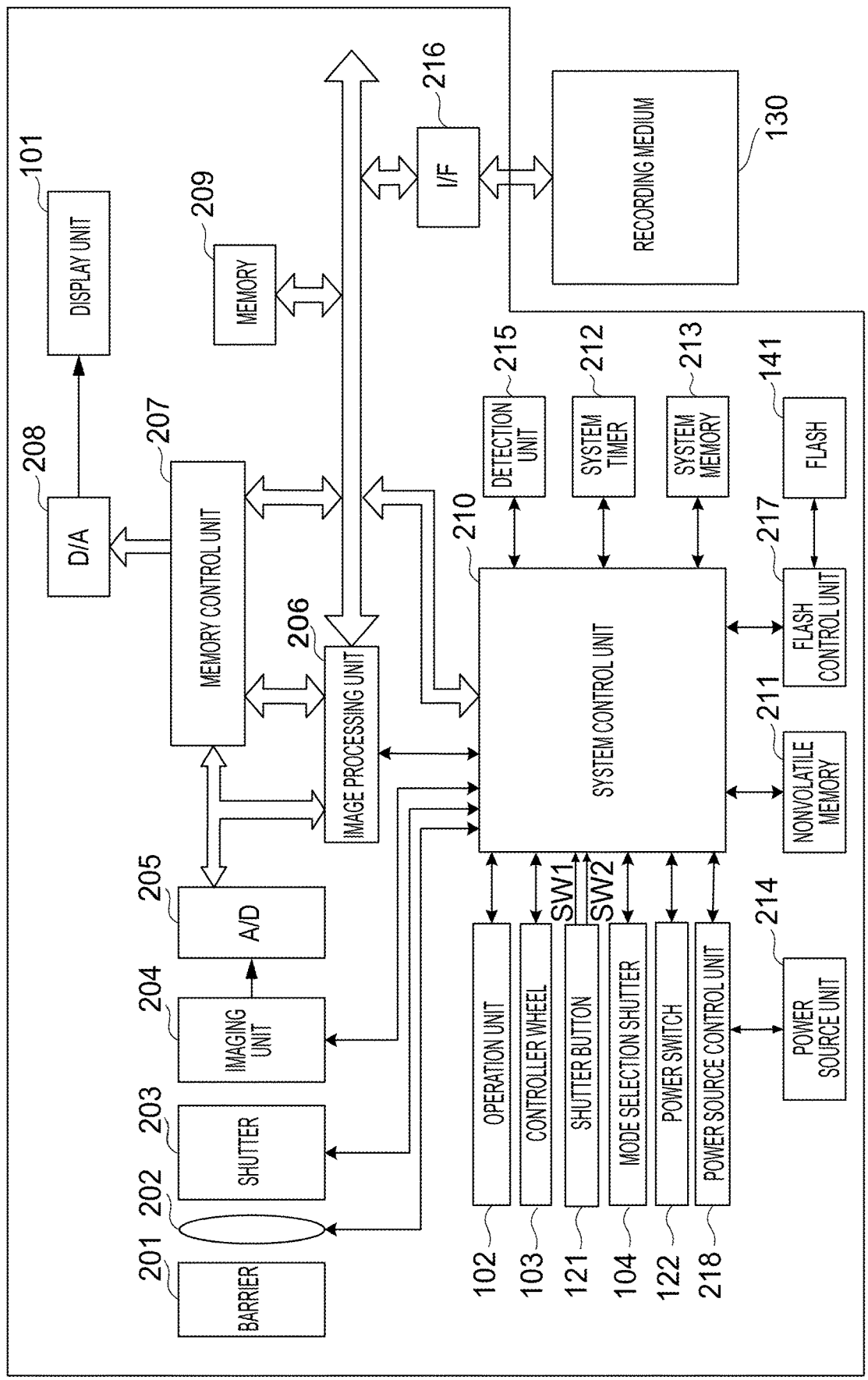
FIG. 2 is a block diagram illustrating a hardware configuration of the digital camera according to an embodiment of the present invention.

FIG. 2 is a block diagram illustrating a hardware configuration of the digital camera 100. The digital camera 100 includes a barrier 201, an imaging lens 202, a shutter 203, and an imaging unit 204. The barrier 201 covers an imaging optical system to prevent the soiling or breakage of the imaging optical system. The imaging lens 202 includes a lens group including a zoom lens and a focus lens and constitutes the imaging optical system. The shutter 203 has an aperture function and adjusts a light exposure to the imaging unit 204. The imaging unit 204 is an imaging element which converts an optical image to an electric signal (analog signal). For example, the imaging unit 204 is an image sensor, such as a CCD sensor or a CMOS sensor, which has a Bayer array structure in which RGB pixels are regularly arranged. The shutter 203 may be a mechanical shutter or an electronic shutter which controls an accumulation time by controlling a rest timing of the imaging element.

The digital camera 100 includes an A/D converter 205, an image processing unit 206, a memory control unit 207, a D/A converter 208, a memory 209, and a system control unit 210. The imaging unit 204 outputs an analog signal to the A/D converter 205. The A/D converter 205 converts the acquired analog signal to image data composed of a digital signal and outputs the image data to the image processing unit 206 or the memory control unit 207.

The image processing unit 206 performs correction processing such as pixel interpolation and shading compensation, white balance processing, gamma correction processing, and color conversion processing on image data acquired from the A/D converter 205 or data acquired from the memory control unit 207. Further, the image processing unit 206 performs cut-out processing and variable magnification processing on an image to implement an electronic zoom function. Further, the image processing unit 206 performs predetermined calculation processing using image data of a captured image. The system control unit 210 performs exposure control and range finding control on the basis of a calculation result obtained in this manner. For example, the system control unit 210 performs through-the-lens (TTL) autofocus (AF) processing, automatic exposure (AE) processing, and pre-flash (EF) processing. The image processing unit 206 performs predetermined calculation processing using image data of a captured image. The system control unit 210 performs TTL automatic white balance (AWB) processing using the obtained calculation result.

The image processing unit 206 includes an image combining processing circuit which combines a plurality of images to generate a panoramic image and determines a result of the combination. The image combining processing circuit is capable of performing not only simple addition combination and averaging combination, but also lighten composite processing or darken composite processing which selects pixels having the lightest or darkest values in respective regions of pieces of image data to be combined to generate a single piece of image data. The image processing unit 206 also performs evaluation and determination of a result of the combination on the basis of a specific standard. The image combining processing circuit may be configured as an image combining unit which differs from the image processing unit 206, or the system control unit 210 may have the function of the image combining processing circuit.

Image data output from the A/D converter 205 is written into the memory 209 through the image processing unit 206 and the memory control unit 207 or through the memory control unit 207. The memory 209 also serves as an image display memory (video memory) which stores image data to be displayed on the display unit 101. The memory 209 has a sufficient capacity capable of storing a predetermined number of still images, a panoramic image (wide-angle image), a panoramic image combining result, a predetermined time of moving image, and audio data. The memory 209 can also be used as a work area where a program which is read out from a nonvolatile memory 211 by the system control unit 210 is developed.

Image display data (digital data) stored in the memory 209 is transmitted to the D/A converter 208. The D/A converter 208 converts the received digital data to an analog signal and supplies the analog signal to the display unit 101. Accordingly, an image is displayed on the display unit 101. The display unit 101 is a display device such as a liquid crystal display or an organic EL display. The display unit 101 displays an image on the basis of an analog signal from the D/A converter 208. The system control unit 210 switches on and off of the image display in the display unit 101. Power consumption can be reduced by turning off the image display. Digital signals accumulated on the memory 209 from the imaging unit 204 through the A/D converter 205 are converted to analog signals by the D/A converter 208 and consecutively displayed on the display unit 101. Accordingly, it is possible to implement an electronic viewfinder function for displaying a live view.

The digital camera 100 includes the nonvolatile memory 211, a system timer 212, a system memory 213, a detection unit 215, and a flash control unit 217. The nonvolatile memory 211 is a memory (e.g., an EEPROM) that is electrically erasable and storable. The nonvolatile memory 211 stores a program executed by the system control unit 210 and a constant for operation. The nonvolatile memory 211 has an area for storing system information and an area for storing user setting information. The system control unit 210 reads out and restores various pieces of information and setting stored in the nonvolatile memory 211 at a start-up time of the digital camera 100.

The system control unit 210 includes a CPU and executes various program condes stored in the nonvolatile memory 211 to control an overall operation of the digital camera 100. A program, a constant for operation, and a variable which are read out from the nonvolatile memory 211 by the system control unit 210 are developed on the system memory 213. A RAM is used as the system memory 213. Further, the system control unit 210 controls the memory 209, the D/A converter 208, and the display unit 101 to perform display control. The system timer 212 measures time used in various controls and time of a built-in clock. The flash control unit 217 controls light emission of the flash 141 according to the brightness of a subject. The detection unit 215 includes a gyroscope and a sensor and acquires angular velocity information and orientation information of the digital camera 100. The angular velocity information includes information of the angular velocity and the angular acceleration during panoramic image capturing by the digital camera 100. The orientation information includes information of the tilt of the digital camera 100 with respect to the horizontal direction.

The display unit 101, the operation unit 102, the controller wheel 103, the shutter button 121, the mode selection switch 104, the power switch 122, and the flash 141 in FIG. 2 are the same as those described above with reference to FIG. 1.

Various operation members that constitute the operation unit 102 are used, for example, in the selection of various functional icons displayed on the display unit 101. A function is assigned for each scene by selecting a predetermined functional icon. That is, the operation members of the operation unit 102 act as various functional buttons. Examples of the functional buttons include an end button, a return button, an image forward button, a lump button, a narrowing-down button, an attribute change button, and a DISP button. For example, when a menu button is pressed down, a menu screen for performing various setting operations is displayed on the display unit 101. A user can intuitively perform a setting operation using the menu screen displayed on the display unit 101, a four-direction button of up and down, left and right, and a SET button.

The controller wheel 103 is an operation member that can be operated to rotate and used in, for example, the designation of a selection item together with the four-direction button. When the controller wheel 103 is operated to rotate, an electric pulse signal corresponding to an operation amount (e.g., a rotation angle or the number of rotations) is generated. The system control unit 210 analyzes the pulse signal to control each unit of the digital camera 100.

The shutter button 121 includes a first switch SW1 and a second switch SW2. The first switch SW1 is turned on by a half-pressed state in the middle of the operation of the shutter button 121. Accordingly, a signal that gives an instruction for the preparation for image capturing is transmitted to the system control unit 210. When the system control unit 210 receives the signal indicating that the first switch SW1 has been turned on, the system control unit 210 starts an operation such as AF processing, AE processing, AWE processing, or EF processing. The second switch SW2 is turned on by a full-pressed state in which the operation of the shutter button 121 is completed. Accordingly, a signal that gives an instruction for the start of image capturing is transmitted to the system control unit 210. When the system control unit 210 receives the signal indicating that the second switch SW2 has been turned on, the system control unit 210 performs a series of image capturing operations from readout of a signal from the imaging unit 204 to writing of image data to the recording medium 130.

The mode selection switch 104 is a switch for switching an operation mode of the digital camera 100 between various modes such as a still image capturing mode, a moving image capturing mode, and a playback mode. The still image capturing mode includes a panoramic image capturing mode which generates a panoramic image by panoramic image capturing in addition to an automatic image capturing mode.

The digital camera 100 includes a power source unit 214 and a power source control unit 218. The power source unit 214 is a primary battery such as an alkaline battery or a lithium battery, a secondary battery such as a NiCd battery, a NiMH battery or a Li battery, or an AC adapter. The power source unit 214 supplies power to the power source control unit 218. The power source control unit 218 detects the presence or absence of a battery attached, the type of a battery, and a remaining battery level in the power source unit 214, and supplies a required voltage to each unit including the recording medium 130 for a required period in accordance with a result of the detection and an instruction of the system control unit 210.

The digital camera 100 includes a recording medium I/F 216 which enables communication between the recording medium 130 and the system control unit 210 when the recording medium 130 is attached to the recording medium slot (not illustrated). The details of the recording medium 130 have already been described above with reference to FIG. 1. Thus, repetitive description thereof will be omitted.

Next, a method of panoramic image capturing and a method for combining a plurality of captured images to generate a panoramic image will be described. First, a process of cutting out a predetermined region from image data of a captured image for generating a panoramic image will be described.

FIGS. 3A to 3D are diagrams for describing the relationship between a moving direction of the digital camera 100 and a cut-out region of image data during panoramic image capturing.

Figure 3A:
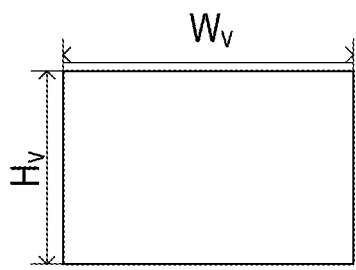
FIGS. 3A to 3D are diagrams for describing the relationship between a moving direction of the digital camera and a cut-out region of image data during panoramic image capturing according to an embodiment of the present invention.
Figure 3B:
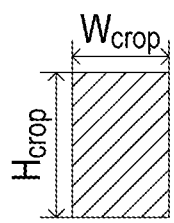

FIG. 3A illustrates an effective image region of the imaging element of the imaging unit 204, where "Wv" represents the number of effective pixels in the horizontal direction, and "Hv" represents the number of effective pixels in the vertical direction. FIG. 3B illustrates a cut-out region which is cut out from image data of a captured image, where "Wcrop" represents the number of cut-out pixels in the horizontal direction, and "Hcrop" represents the number of cut-out pixels in the vertical direction.

Figure 3C:
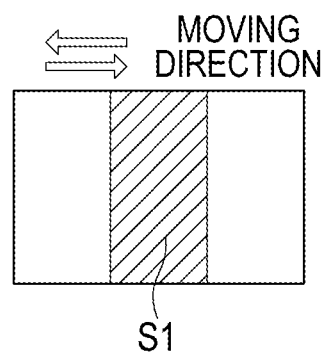

FIG. 3C illustrates a cut-out region with respect to image data when panoramic image capturing is performed while moving the digital camera 100 in the horizontal direction indicated by arrows. A region S1 indicated by hatching in FIG. 3C represents the cut-out region from the image data and satisfies the following Formula 1 and Formula 2.

$$Wv > Wcrop \qquad \text{(Formula 1)}$$

$$Hv = Hcrop \qquad \text{(Formula 9)}$$

Figure 3D:
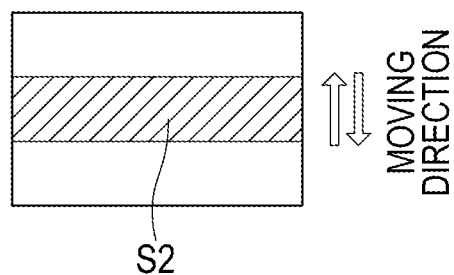

Similarly, FIG. 3D illustrates a cut-out region with respect to image data when panoramic image capturing is performed while moving the digital camera 100 in the vertical direction indicated by arrows. A region S2 indicated by hatching in FIG. 3D represents the cut-out region of the image data and satisfies the following Formula 3 and Formula 4.

$$Wv = Wcrop \qquad \text{(Formula 3)}$$

$$Hv > Hcrop \qquad \text{(Formula 4)}$$

The cut-out region of image data of a captured image may differ between image data items. Further, image data items at the start and end of panoramic image capturing may have a wide cut-out region so as to expand a field angle. The cut-out region of image data can be determined, for example, on the basis of the difference between the angle of the digital camera 100 immediately after image capturing and the angle of the digital camera. 100 one frame before thereof. The capacity of the memory 209 can be saved by cutting out and storing image data that is required for combining processing for generating a panoramic image.

Next, a combining method for generating a panoramic image will be described. The system control unit 210 reads out cut-out regions stored during panoramic image capturing from the memory 209 and detects a positional shift between images corresponding to the read image data items. As an example, the system control unit 210 divides the cut-out region into small blocks having any size and calculates corresponding points having the smallest sum of absolute difference (SAD) of brightness for the respective small blocks. The system control unit 210 is capable of calculating a motion vector from the calculated corresponding points having the smallest SAD. The system control unit 210 may use angular velocity information or orientation information detected by the detection unit 215 in the calculation of the motion vector. Then, the system control unit 210 corrects a positional shaft between the images of the cut-out regions on the basis of the motion vector obtained between the images of adjacent cut-out regions and combines overlapping parts between the images of the cut-out regions by weighted addition.

Figure 4A:
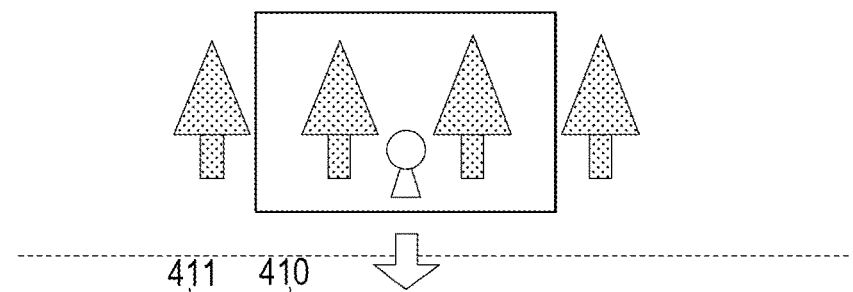
FIGS. 4A to 4F are diagrams illustrating the flow of combining processing for generating a panoramic image according to an embodiment of the present invention.
Figure 4B:
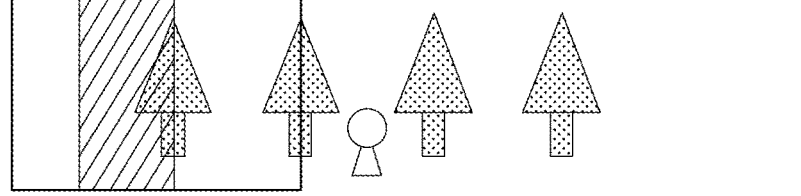
Figure 4C:
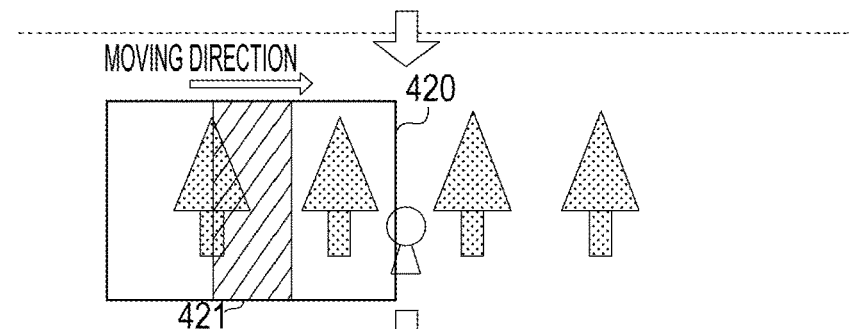
Figure 4D:
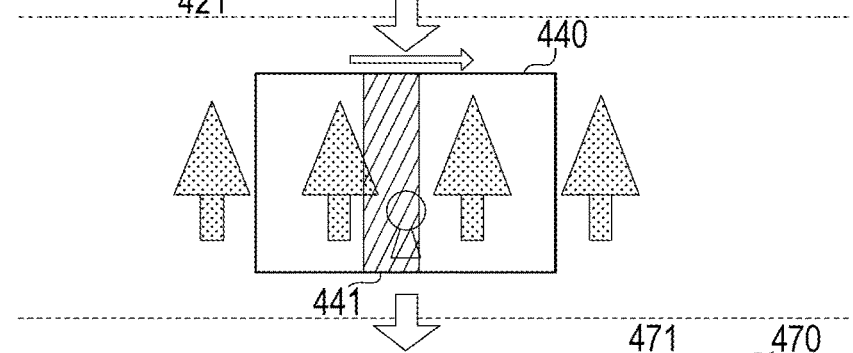
Figure 4E:
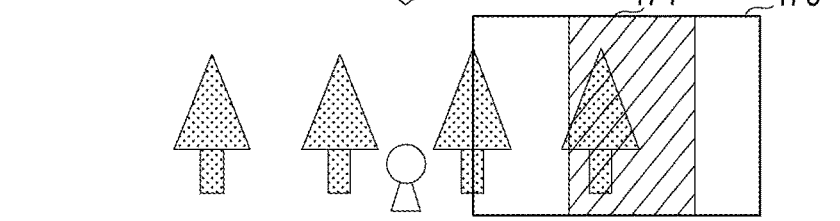

FIGS. 4A to 4F are diagrams describing the flow of combining processing for generating a panoramic image. In FIGS. 4A to 4F, dot regions schematically represent a row of tress a subject field, and hatched regions represent cut-out regions of image data items. FIG. 4A illustrates a state in which a user presses down the shutter button 121 to turn on the first switch SW1, and the user brings a main subject into focus. Here, a subject that is scheduled to be located on the center of the panoramic image is brought into focus. However, a subject that is located at a position where image capturing for the panoramic image is started may be brought into focus. FIG. 4B illustrates a position where the second switch SW2 of the shutter button 121 is turned on, and the user sets a subject field aligned with one end of the panoramic image to be generated. In FIG. 4B, the imaging unit 204 captures an image 410. FIGS. 4C to 4E schematically illustrate a state in which the user performs panoramic image capturing while moving the digital camera 100 toward the other end of the panoramic image to be generated. FIG. 4E illustrates a state in which the user stops the press of the shutter button 121 to finish the panoramic image capturing. In FIGS. 4B to 4E, although the imaging unit 204 captures seven images 410 to 470 in total, the images 430, 450, and 460 are not illustrated. The image processing unit 206 performs cut-out processing on the images 410 to 470 captured by the imaging unit 204 to generate cut-out regions 411 to 471. In the system control unit 210, the width each cut-out region may be previously determined may be changed according to a moving speed of the digital camera 100 during panoramic image capturing.

Figure 4F:
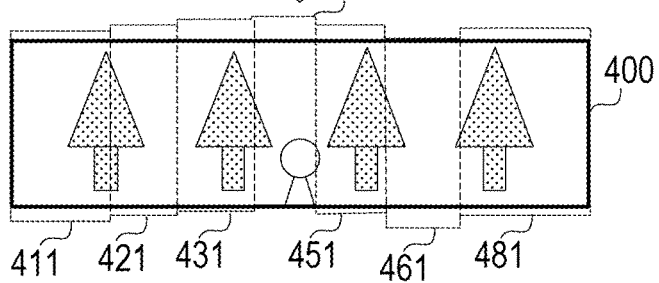

FIG. 4F illustrates the panoramic image which is generated by the image processing unit 206 by combining the plurality of images captured by the imaging unit 204. Due to camera shake or the like, the upper sides and the lower sides of the cut-out regions 411 to 471 are not aligned. Thus, the image processing unit 206 performs cut-out processing also in the vertical direction. The height of a region 400 may be set according to a positional shift amount in the vertical direction between all the images or may be set at a fixed value that is previously and experimentally obtained. As a result, the image processing unit 206 generates the panoramic image as indicated by the region 400.

FIGS. 4A to 4F illustrate an example in which the cut-out regions 411 to 471 are cut out so as to be adjacent to each other and have no overlapping region therebetween. If there is a superimposed region, the image processing unit 206 outputs pixel information of one cut-out region to the left side with respect to the center of the superimposed region defined as a boundary and outputs pixel information of the other cut-out region to the right side with respect to the center in a combined image. Alternatively, the image processing unit 206 performs the combining processing by outputting a value obtained by adding 50% of pixel information of one cut-out region and 50% of pixel information of the other cut-out region on the boundary, and increasing the ratio of the one cut-out region on the left side with respect to the boundary and increasing the ratio of the other cut-out region on the right side with respect to the boundary as the distance from the boundary increases.

Desirably, the image processing unit 206 performs combining processing between images of the regions 411 and 412 illustrated in FIGS. 4A and 4B in parallel with image capturing processing for the image 420 illustrated in FIG. 4C without waiting for the finish of the press of the shutter button 121. The entire combining processing time for generating the panoramic image can be reduced by the parallel processing of the image capturing processing and the combining processing by the image processing unit 206. The image processing unit 206 temporarily stores the generated panoramic image in the memory 209 through the memory control unit 207. At last, the system control unit 210 records the panoramic image stored in the memory 209 on the recording medium 130 through the I/F 216.

However, in the combining processing for generating a panoramic image as illustrated in FIGS. 4A to 4F, an unnatural panoramic image may be generated. Hereinbelow, an unsuccessful example of panoramic combination will be described.

Figure 5A:
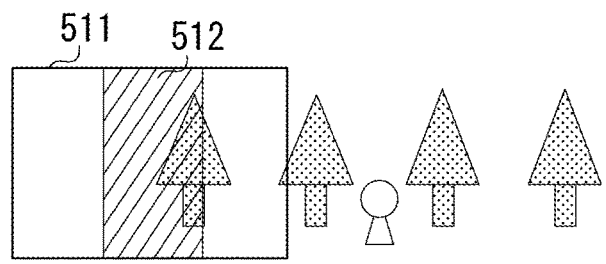
FIGS. 5A to 5F are diagrams for describing an unsuccessful example of panoramic combination.
Figure 5B:
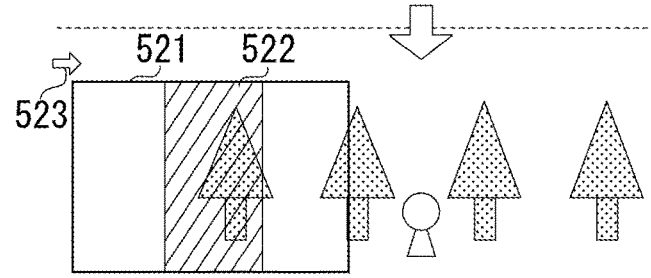
Figure 5C:
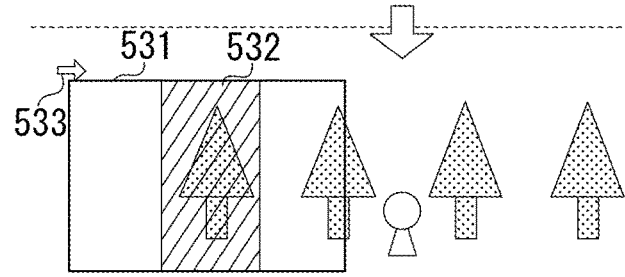
Figure 5D:
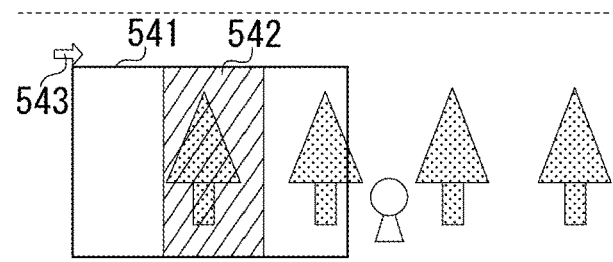
Figure 5E:
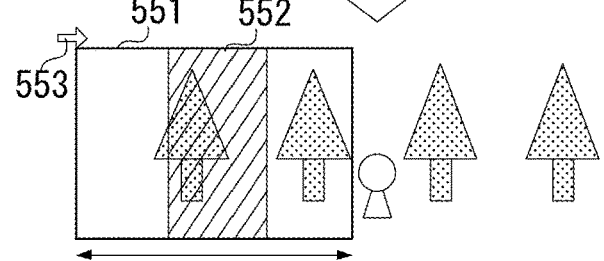
Figure 5F:
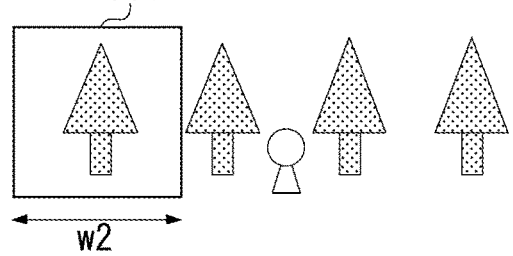

FIGS. 5A to 5F are diagrams for describing an unsuccessful example of panoramic combination. FIGS. 5A to 5E schematically illustrate image capturing scenes of panoramic image capturing in order. Images 511, 521, 531, 541, and 551 represent images captured by the imaging unit 204. Similarly to FIGS. 4A to 4F, hatched regions 512, 522, 532, 542, and 552 represent cut-out regions of image data items. Arrows 523, 533, 543, and 553 represent a moving direction and a moving amount of the digital camera 100 in each image capturing with respect to the immediately preceding image capturing. The system control unit 210 is capable of calculating the moving direction and the moving amount on the basis of angular velocity information and orientation information detected by detection unit 215 and motion vector information. FIG. 5F schematically illustrates a panoramic image which is obtained as a result of combining the plurality of images illustrated in FIGS. 5A to 5E. A rectangular region 561 represents an image capturing field angle of the panoramic image.

Hereinbelow, combining processing for generating a panoramic image will be described with reference to FIGS. 5A to 5F. First, a user maintains a pressed-down state of the shutter button 121 while moving the digital camera 100 rightward so that the imaging unit 204 repeatedly performs image capturing at different image capturing field angles. Images obtained in this manner are denoted by the images 511, 521, 531, 541, and 551 in FIGS. 5A to 5E. Then, the image processing unit 206 cuts out the regions 512, 522, 532, 542, and 552 from the respective images. The memory control unit 107 temporarily stores images of these cut-out regions in the memory 209. The image processing unit 206 performs alignment processing an the cut-out images of the respective captured image data items of FIGS. 5A to 5E stored in the memory 209 and then combines the cut-out images to generate a panoramic image having the image capturing field angle indicated by the rectangular region 561 of FIG. 5F. A width w1 indicated under the image 551 in FIG. 5E represents the width of the captured image. A width w2 indicated under the rectangular region 561 in FIG. 5F represents the width of the generated panoramic image.

When the moving amount of the digital camera 100 while the shutter button 121 is pressed down is small, overlapping regions between the cut-out regions 512 to 552 become large, which results in a narrow panoramic image as illustrated in FIG. 5F. In particular, when the width w2 of the panoramic image is smaller than the width w1 of the image which is obtained by normal image capturing, a user is highly likely to have a strange feeling. Thus, when the width w2 of a panoramic image is smaller than a threshold, the system control unit 210 determines that the generation of the panoramic image is unsuccessful.

Figure 6A:
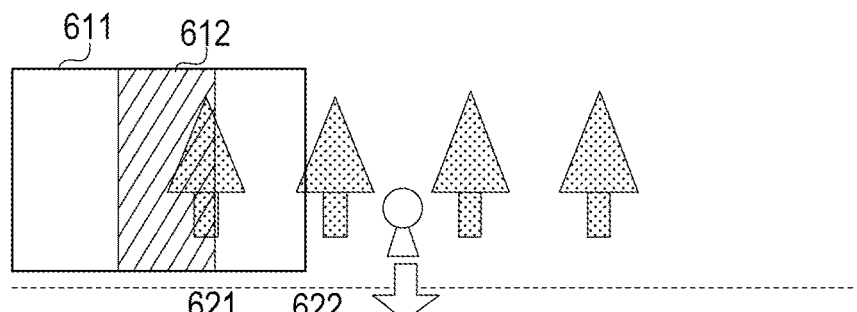
FIGS. 6A to 6F are diagrams for describing another unsuccessful example of panoramic combination.
Figure 6B:
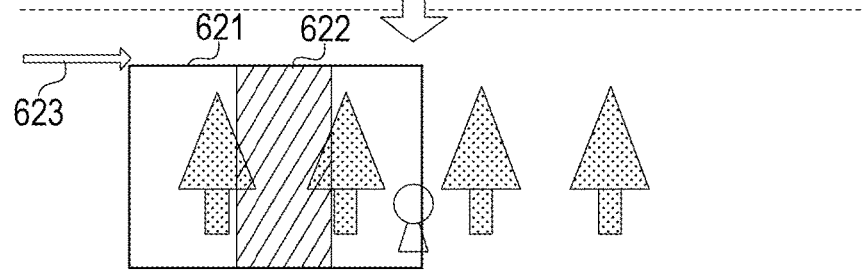
Figure 6C:
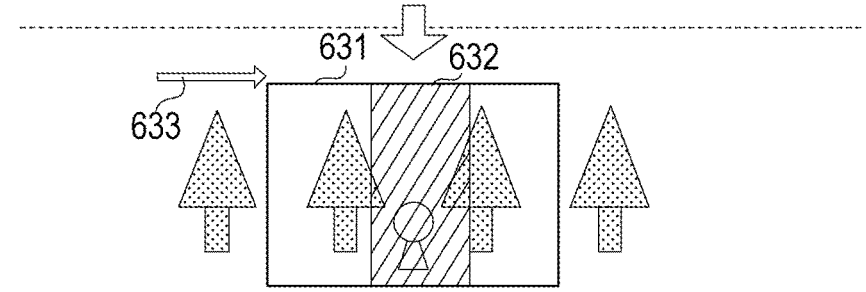
Figure 6D:
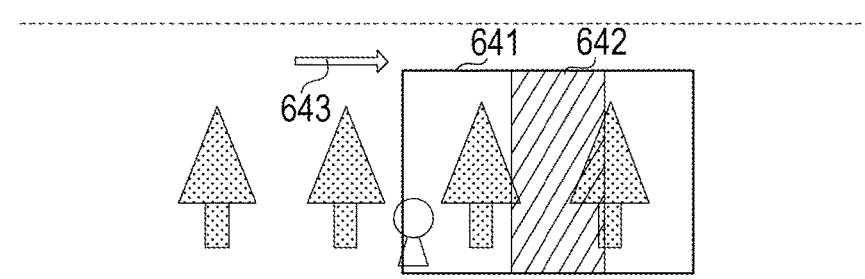
Figure 6E:
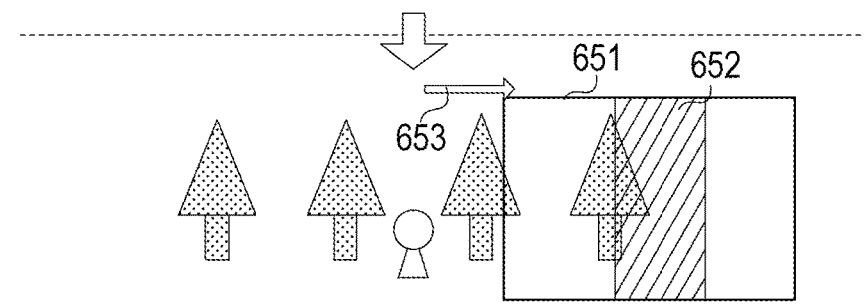
Figure 6F:
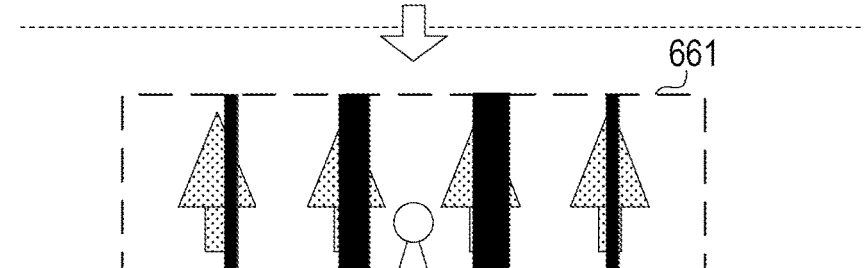

FIGS. 6A to 6F are diagrams for describing another unsuccessful example of panoramic combination. FIGS. 6A to 6E schematically illustrate image capturing scenes of panoramic image capturing in order. Images 611, 621, 631, 641, and 651 are captured by the imaging unit 204. Similarly to FIGS. 4A to 4F, hatched regions 612, 622, 632, 642, and 652 represent cut-out regions of image data items. Arrows 623, 633, 643, and 653 represent a moving direction. and a moving amount of the digital camera 100 in each image capturing with respect to the immediately preceding image capturing. FIG. 6F schematically illustrates a result of combining the plurality of images illustrated in FIGS. 6A to 6E. A rectangular region 661 represents an image of an image capturing field angle of a combined image.

As illustrated in FIG. 6F, the cut-out regions 612 to 652 are not in contact with each other, and there is no overlapping region therebetween. Thus, combining processing cannot be performed. Specifically, the system control unit 210 performs integral calculation for a time interval of panoramic image capturing with respect to a speed detected by the detection unit 215 to calculate the moving amount indicated by each of the arrows 623 to 653. Alternatively, the system control unit 210 calculates the moving amount indicated by each of the arrows 623 to 653 on the basis of a motion vector between the images. A method for detecting the motion vector may be a known method, and an example of the method includes template matching. In this method, a comparison in made on the shift amount between images by setting a template of a predetermined range, and a shift amount at the position having the smallest compared value (the position having the highest correlation between the images) is detected as a motion vector. Then, the system control unit 210 compares the calculated movement amounts indicated by the arrows 623 to 653 with the widths of the respective cut-out regions 622 to 652. When the movement amount of at least one place exceeds the width of the corresponding cut-out region, the system control unit 210 determines that the generation of a panoramic image is unsuccessful. Alternatively, the system control unit 210 may previously define the range of the moving speed of the digital camera 100 and may determine that the generation of a panoramic image is unsuccessful when a speed detected by the detection unit 215 exceeds the defined range. Even in a case where the moving amount exceeds the width of the cut-out region, when the width w2 of a panoramic image generated so far is larger than the threshold, it may be determined that the generation of the panoramic image is successful.

In the present embodiment, when the system control unit 210 determines that the generation of a panoramic image is unsuccessful, any one of the captured images or a cut-out image of any one of the captured images is recorded so as not to give a user an image that causes a strange feeling. Hereinbelow, the processing of the present embodiment will be described with reference to a flowchart.

Figure 7:
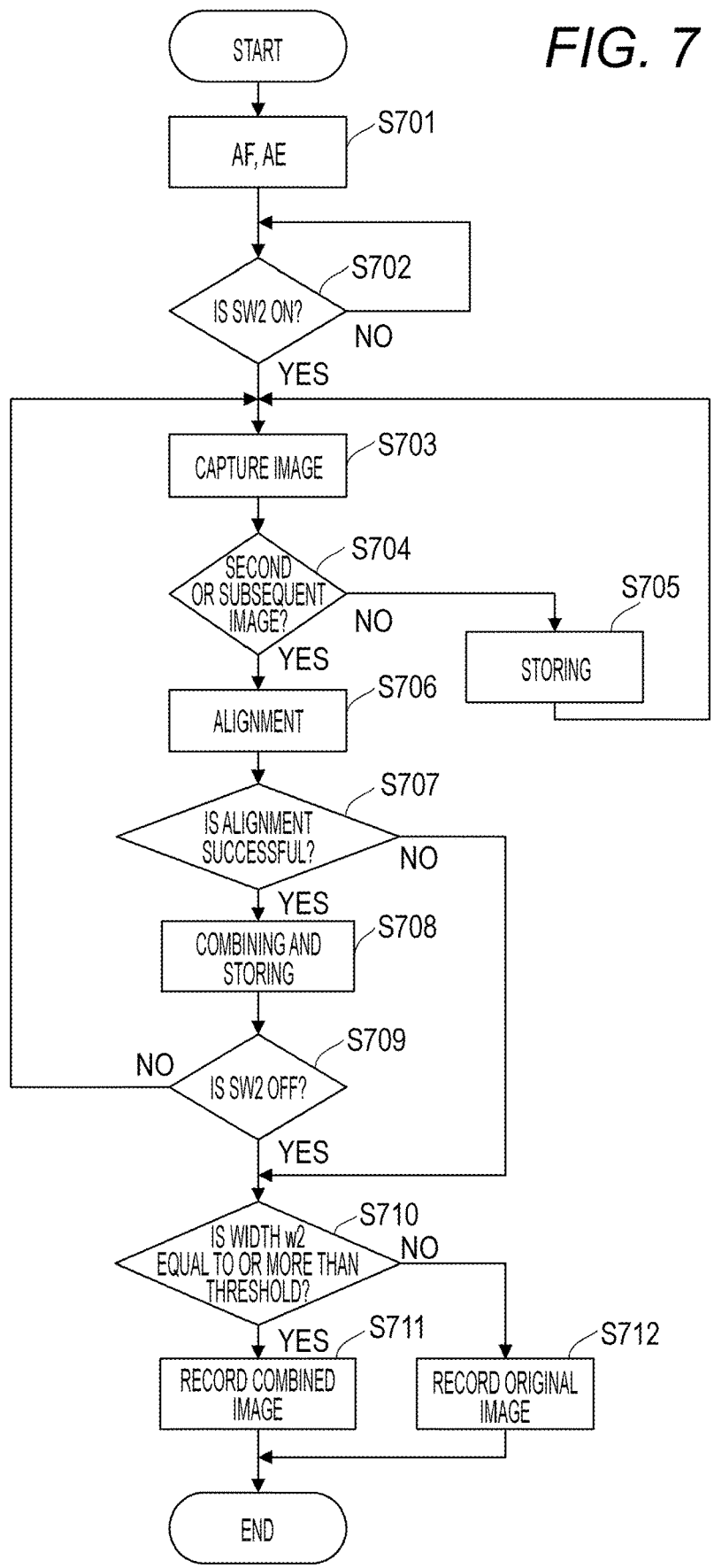
FIG. 7 is a flowchart for describing panoramic image capturing processing in a first embodiment.

FIG. 7 is a flowchart for describing panoramic image capturing processing in the present embodiment.

When a user sets a mode for generating a panoramic image and presses the shutter button 121 halfway down (turns on the SW1), the flowchart illustrated in FIG. 7 is started.

In step S701, the system control unit 210 performs AF for focus adjustment and AE for proper exposure.

In step S702, the system control unit 210 waits until the shutter button 121 is pressed fully (the SW2 is turned on). When the digital camera 100 is moved to a start position of the panoramic image in a period between when the SW1 is turned on and when the SW2 is turned on, it is possible to change a subject to be focused and exposed and the start position of the panoramic image.

In step S703, the imaging unit 204 performs image capturing for panoramic combination.

In step S704, the system control unit 210 proceeds to step S705 when the image captured in step S703 is the first image and proceeds to step S706 when the image captured in step S703 is the second or subsequent image.

In step S705, the system control unit 210 stores the first image captured in step S703 in the memory 209 through the memory control unit 207, and returns to step S703.

In step S706, the imaging unit 204 detects a movement amount and a motion vector between an image previously captured and an image newly captured, and performs alignment between these images.

In step S707, the system control unit 210 proceeds to step S708 when the alignment is successful. When the alignment is unsuccessful, the system control unit 210 notifies the user that the alignment is unsuccessful and proceeds to step S710. When the alignment is unsuccessful, the system control unit 210 may proceed to step S712.

In step S708, the image processing unit 206 cuts out a region used for combination from the newly captured image. Further, the image processing unit 206 reads out the previously combined image from the memory 209 through the memory control unit 207 and combines the newly cut-out image with the previously combined image. Then, the newly combined image is stored in the memory 209 through the memory control unit 207. An image in a region that is not used for the combination is deleted from the memory 209, so that the capacity of the memory 209 can be saved.

In step S709, the system control unit 210 determines whether the full-press of the shutter button is released (the SW2 is turned off). The system control unit 210 proceeds to step S710 when the full-press is released and returns to step S703 when the full-press is not released.

In step S710, the system control unit 210 determines whether the width w2 of the combined panoramic image is equal to or more than the threshold. The threshold may be the width w1 of an image obtained by one image capturing or may be set at any value that may make an image easily recognizable as a panoramic image. When the width w2 is equal to or more than the threshold, the system control unit 210 determines that the generation of the panoramic image is successful and proceeds to step S711. When the width w2 is less than the threshold, the system control unit 210 determines that the generation of the panoramic image is unsuccessful and proceeds to step S712.

In step S711, the system control unit 210 reads out the combined image from the memory 209 through the memory control unit 207 and records the read combined image on the recording medium 130. Then, the system control unit 210 finishes the flowchart.

In step S712, the system control unit 210 reads out the first captured image recorded in step S706 from the memory 209 through the memory control unit 207 and records the read image on the recording medium 130. Then, the system control unit 210 finishes the flowchart.

As described above, according to the present embodiment, when the generation of a panoramic image is unsuccessful, any of images captured for generating the panoramic image is recorded instead of the panoramic image. With such a configuration, it is not necessary for a user to redo image capturing, and an unnecessary increase in the number of recorded images is prevented when the generation of a panoramic image is unsuccessful.

In the present embodiment, when the generation of a panoramic image is unsuccessful, the first captured image is recorded on the recording medium 130. This is because the first image is captured at the image capturing start point when a user is clearly conscious of image capturing. However, this is merely an example. When the generation of a panoramic image is unsuccessful, an image that is captured immediately before the determination that the alignment is unsuccessful may be recorded on the recording medium 130 instead of the first image. It is possible to record an image that is flesh in user's memory by recording an image that is captured as later as possible.

Alternatively, an image that is captured earliest among images that do not include a region that is not used in the generation of a panoramic image may be recorded on the recording medium 130. FIGS. 8A to 8F are diagrams for describing an example of the selection of a recorded image. Images 811, 821, 831, 841, and 851 of FIGS. 8A to 8E are captured by the imaging unit 204. Hatched regions 812, 822, 832, 842, and 852 represent cut-out regions of image data items. When a partial region near the central part of each captured image is cut out to perform combining processing for generating a panoramic image, a region located on the left side with respect to the cut-out region 812 in the image 811 is not used for the generation of the panoramic image. Thus, the image 821 which is captured earliest among images that do not include the region located on the Left side with respect a left boundary 801 of the region 812 is selected as an image 803 to be recorded on the recording medium 130. This makes it possible to record the image that is close to an image capturing start point when a user is clearly conscious of image capturing and includes an image capturing field angle that may be included in the panoramic image.

In the present embodiment, panoramic image capturing is performed while the digital camera 100 moves rightward. However, the moving direction of the digital camera 100 is not limited to any direction. The present embodiment can also be performed when the digital camera 100 moves leftward, in the up-down direction, and an oblique direction.

Second Embodiment

A second embodiment differs from the first embodiment in that, when the system control unit 210 determines that the generation of a panoramic image is unsuccessful and records any of captured images, cut-out processing is performed on the captured image to be recorded.

Figure 9:
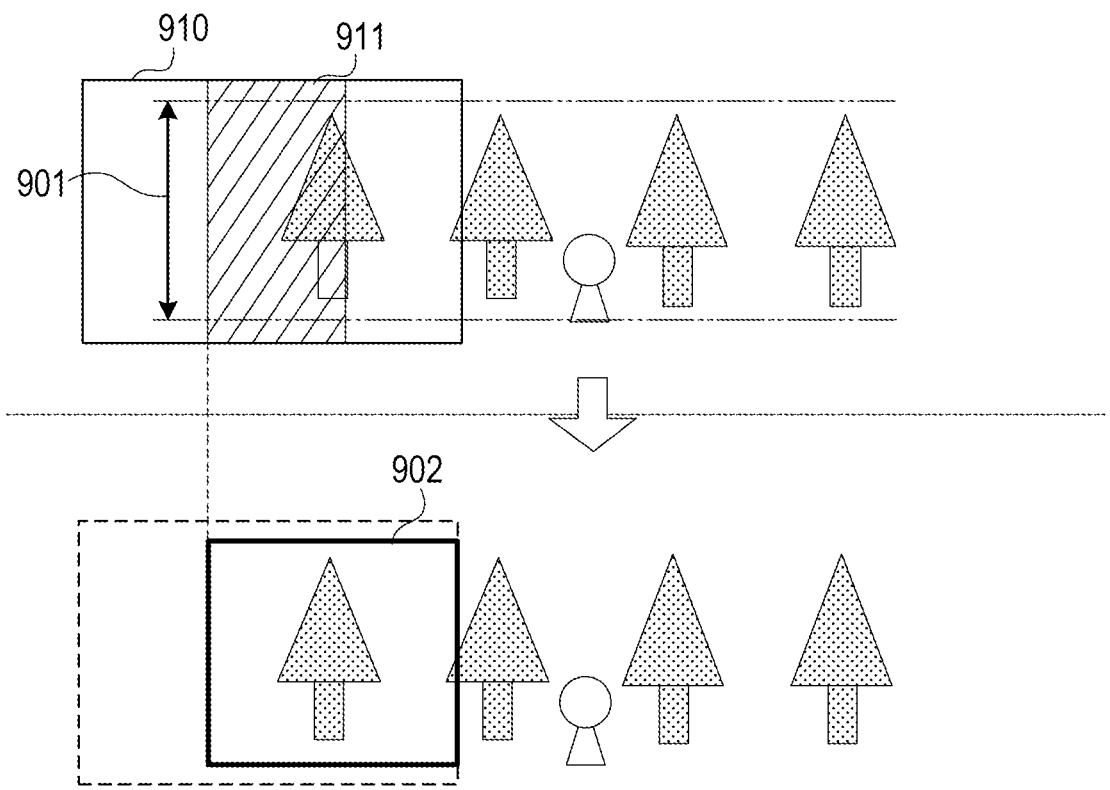
FIG. 9 is a diagram for describing an example of cut-out processing on a captured image in a second embodiment.

FIG. 9 is a diagram for describing an example of cut-out processing on a captured image in the second embodiment. In step S712 of FIG. 7, the system control unit 210 performs the cut-out processing on any of captured images and records the cut-out image on the recording medium 130.

As illustrated in FIG. 4F, in the panoramic image generated by the image processing unit 206, the cut-out regions of the captured images are not entirely used, but partially cut out in the up-down direction to create the final combined. image. An image 910 and a cut-out region 911 of FIG. 9 respectively correspond to the image 410 and the cut-out region 411 of FIGS. 4A to 4F. However, this is merely an example, and the present embodiment can also be performed with respect to any of the images 410 to 470 of FIGS. 4A to 4F.

An arrow 901 indicates the height of a panoramic image that should be originally generated by successful combining processing as illustrated in FIG. 4F. A rectangular region 902 indicates a recorded image region after cut-out processing in the lateral direction and the vertical direction. That is, the image processing unit 206 cuts off a part of the image 910 that is not used for the generation of a panoramic image, specifically, a left part with respect to a cut-out region 911 and upper and lower ranges outside the arrow 901. The upper and lower ranges to be cut off may be a previously determined or may be set according to a positional shift amount in the up-down direction between images. In the latter case, when a detected positional shift in the up-down direction is smaller than the threshold, the upper and lower ranges may not be cut off.

The above processing makes it possible to record an image having a height substantially equal to the height of a panoramic image that should be originally generated by successful combining processing.

Alternatively, the image processing unit 206 may perform cut-out processing that results in a previously set aspect ratio of a panoramic image. Specifically, the width in the moving direction during panoramic image capturing is set to be longer than the width in the direction perpendicular to the moving direction. Accordingly, a captured image to be recorded after the cut-out processing more looks like a panoramic image. The height of the recorded image and the aspect ratio of the recorded image may be determined by a user according to his/her preference.

Third Embodiment

A third embodiment differs from the first embodiment in the way of selecting an image to be recorded on the recording medium 130 when the system control unit 210 determines that the generation of a panoramic image is unsuccessful. Hereinbelow, the third embodiment will be described in detail. Description for points similar to the first embodiment will be omitted.

The flow of the present embodiment is similar to the flow of the first embodiment illustrated in FIG. 7. In panoramic image capturing, a user often sets a main subject on the center. Thus, in the present embodiment, the system control unit selects an image that is located on the center of the entire image capturing field angle intended by a user and records the captured image in step S712.

Figure 10A:
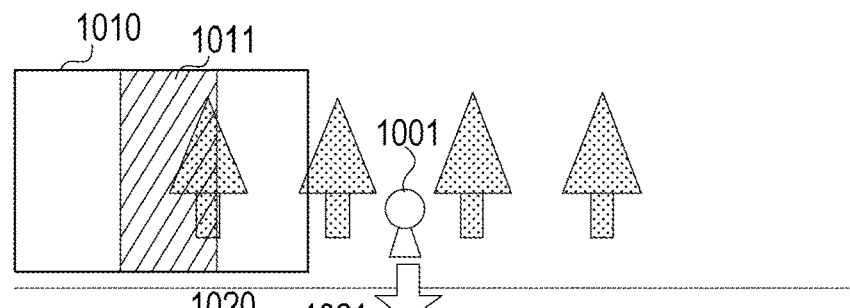
FIGS. 10A to 10F are diagrams for describing an example of the selection of a recorded image in a third embodiment.
Figure 10B:
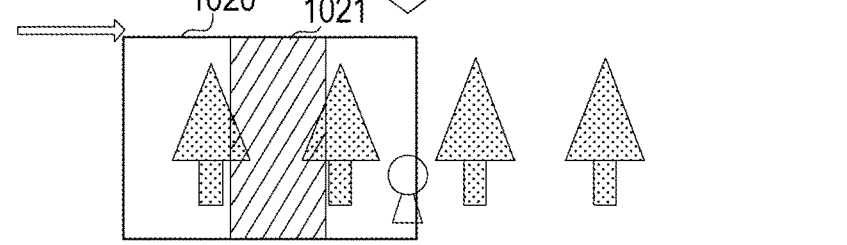
Figure 10C:
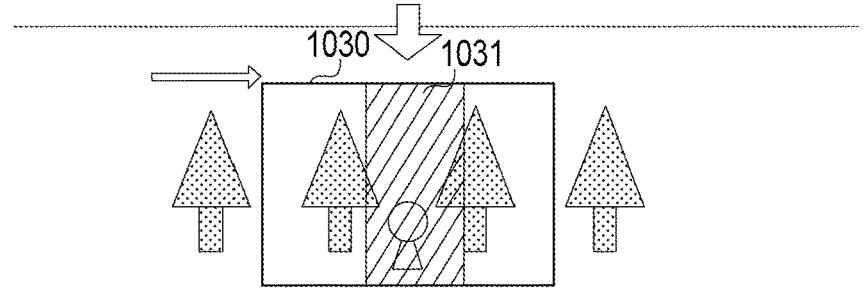
Figure 10D:
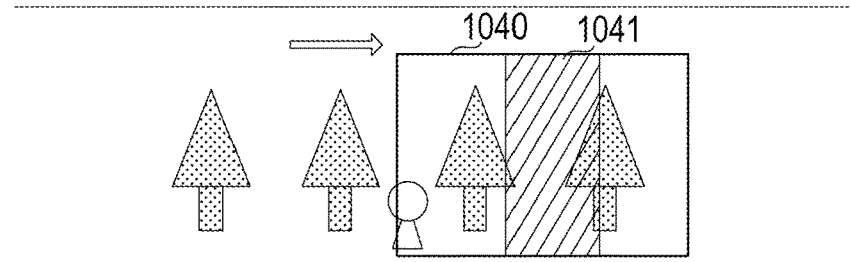
Figure 10E:
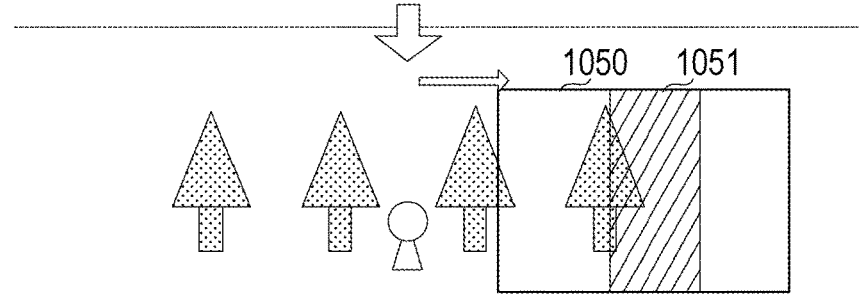
Figure 10F:
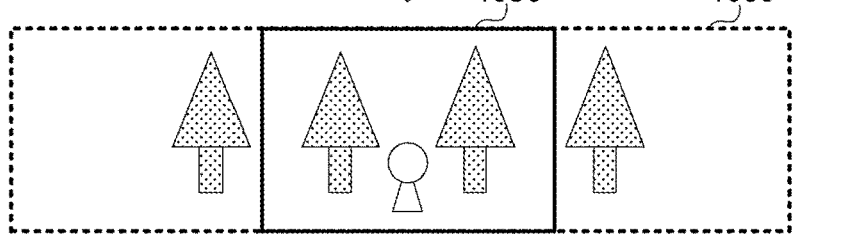

FIGS. 10A to 10F are diagrams for describing an example of the selection of a recorded image in the present embodiment. FIGS. 10A to 10E illustrate a state in which a user performs panoramic image capturing with a main subject 1001 set on the center. The imaging unit 204 captures images 1010 to 1050 in a time-ordered manner. The image processing unit 206 generates cut-out regions 1011 to 1051. Similarly to the situation illustrated in FIGS. 6A to 6F, FIGS. 10A to 10F include a subject region having no cut-out region (e.g., a part of a tree located between the region 1031 and the region 1041). Thus, in step S710, the system control unit 210 determines that the panoramic combination is unsuccessful. Then, in step S712, as illustrated in FIG. 10F, the system control unit 210 records the image 1030 which is closest to the center of an image capturing field angle 1060 that is generated when the panoramic combination is successful. The position of the digital camera 100 when capturing each of the images is calculated by the system control unit 210 on the basis of information such as a speed detected by the detection unit 215 as described above.

As described in the first embodiment, image capturing itself may be stopped at the point when the combining processing for generating a panoramic image is determined to be unsuccessful. In such a method, the image capturing is not performed until the end of the image capturing field angle of a panoramic image that is generated by successful combining processing. Thus, it is not possible to determine the center of the entire image capturing field angle of the panoramic image by the determination method as described above. However, a main subject can be determined by a method as described below.

Figure 11A:
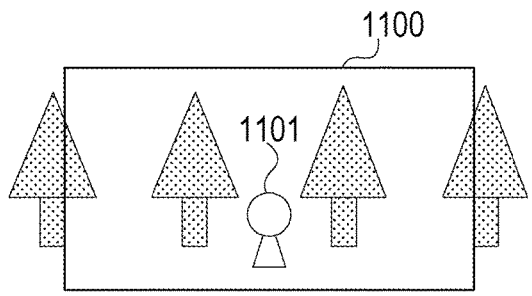
FIGS. 11A to 11E are diagrams for describing another example of the selection of a recorded image in a third embodiment.
Figure 11B:
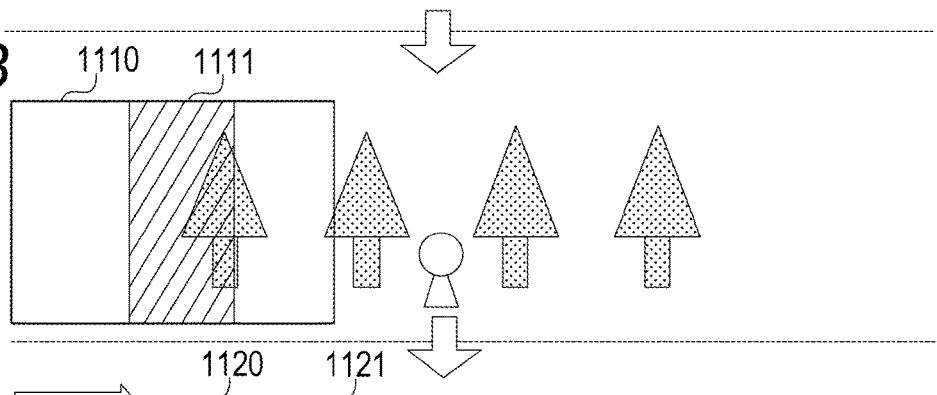
Figure 11C:
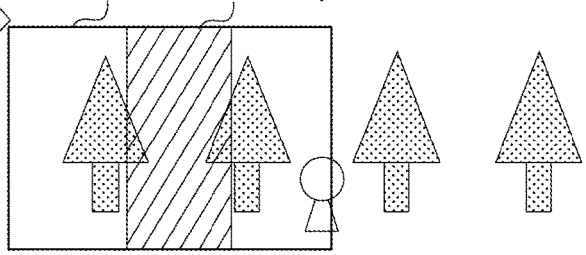
Figure 11D:
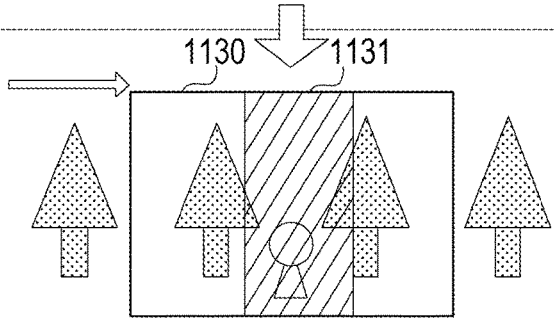
Figure 11E:
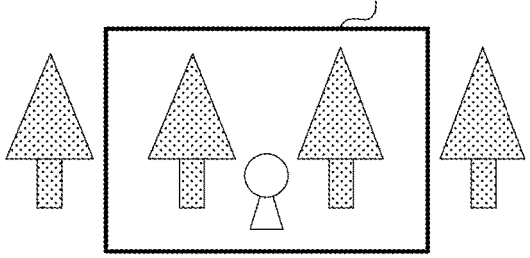

FIGS. 11A to 11E are diagrams for describing another example of the selection of a recorded image in the present embodiment. In FIG. 11A, a user performs focus adjustment similarly to FIG. 4A. In FIG. 11A, a subject 1101 is brought into focus, and an image capturing field angle 1100 indicates a range captured by the imaging unit 204 at this time. Then, in FIGS. 11E to 11D, the imaging unit 204 captures images 1110 to 1130. The detection unit 215 of the digital camera 100 starts acquiring angular velocity information and orientation information at least at the point when the focus adjustment is performed. The relative position of the digital camera 100 in FIGS. 11A to 11D can be calculated from the acquired information.

A user often brings a main subject into focus. Thus, the system control unit 210 compares the positions of the images 1110 to 1130 with the position of the image capturing field angle 1100 on the basis of the information acquired by the detection unit 215. Then, the system control unit 210 determines that the image 1130 which is closest to the image capturing field angle 1100 includes the main subject and records the image 1130.

Alternatively, for example, there is also another method in which the digital camera 100 acquires a subject distance, the closest subject is determined to be a main subject, and an image including the main subject is selected and recorded. Alternatively, when a plurality of captured images include a main subject, an image including the main subject in the largest area or an image including the main subject closest to the central part of the field angle may be recorded. Alternatively, when a main subject is a human, an image in which the face can be detected may be recorded as a main subject.

As described above, according to the third embodiment, when the generation of a panoramic image is unsuccessful, one captured image including a main subject can be recorded instead of a combined image. Further, the cut-out processing described in the second embodiment can be applied to a captured image selected by any of the methods.

Other Embodiments

In the above embodiments, the description has been made on the basis of a digital camera for individuals. However, the above embodiments can also be applied to a portable device or a smartphone, or a network camera connected to a server that is equipped with panoramic image capturing and combining functions.

Embodiments of the present invention can also be implemented by processing of supplying a program that implements one or more functions of the above embodiments to a system or apparatus through a network or a recording medium and reading out and activating the program by one or more processors in a computer of the system or apparatus. Further, embodiments of the present invention can also be implemented by a circuit (e.g., ASIC) that implements one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-090578, filed Apr. 28, 2017, which is hereby incorporated by reference herein in its entirety.

What is claimed is:

1. An image processing apparatus comprising:
at least one memory;
at least one processor connected to the at least one memory and configured to execute instructions to:
combine a plurality of images to generate a first panoramic image; and
cut out a part of a first image of the plurality of images to generate a second image, when a width of the first panoramic image is determined by the at least one processor to be not wider than a predetermined width, wherein the predetermined width is a width of one image of the plurality of images,
wherein the first image is one image captured earliest among the plurality of images, and the second image has a predetermined aspect ratio.

2. The image processing apparatus according to claim 1, further comprising:
an imaging sensor,
wherein the at least one processor executes further instructions to combine the plurality of images to generate the first panoramic image while the imaging sensor captures the plurality of images.

3. The image processing apparatus according to claim 2, further comprising:
a recording unit,
wherein, when the width of the first panoramic image is not wider than the predetermined width, the recording unit records the second image.

4. The image processing apparatus according to claim 2, further comprising:

a recording unit,
wherein, when the width of the first panoramic image is wider than the predetermined width, the recording unit records the first panoramic image.

5. The image processing apparatus according to claim 1, wherein the at least one processor executes further instructions to cut out the first panoramic image to generate a second panoramic image according to the predetermined aspect ratio.

6. The image processing apparatus according to claim 1, wherein the first image and the second image have a same width in a horizontal direction, and the first image is wider than the second image in a vertical direction.

7. The image processing apparatus according to claim 1, wherein the at least one processor executes further instructions to cut out partial regions of the plurality of images, perform alignment on the cut-out regions, and combine the cut-out regions to generate the first panoramic image.

8. An image processing apparatus control method, comprising:
  combining a plurality of images to generate a first panoramic image; and
  cutting out a part of a first image of the plurality of images to generate a second image, when a width of the first panoramic image is determined by at least one processor to be not wider than a predetermined width, wherein the predetermined width is a width of one image of the plurality of images,
  wherein the first image is one image captured earliest among the plurality of images, and the second image has a predetermined aspect ratio.

9. A non-transitory computer readable storage medium, storing instructions, which when executed by at least one processor, cause the at least one processor to:
  combine a plurality of images to generate a first panoramic image; and
  cut out a part of a first image of the plurality of images to generate a second image, when a width of the first panoramic image is determined by the at least one processor to be not wider than a predetermined width, wherein the predetermined width is a width of one image of the plurality of images,
  wherein the first image is one image captured earliest among the plurality of images, and the second image has a predetermined aspect ratio.

* * * * *